United States Patent
Takamura

(10) Patent No.: US 11,800,129 B2
(45) Date of Patent: Oct. 24, 2023

(54) IMAGE GENERATION APPARATUS, IMAGE GENERATION METHOD AND PROGRAM

(71) Applicant: NIPPON TELEGRAPH AND TELEPHONE CORPORATION, Tokyo (JP)

(72) Inventor: Seishi Takamura, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 223 days.

(21) Appl. No.: 17/600,009

(22) PCT Filed: Mar. 30, 2020

(86) PCT No.: PCT/JP2020/014529
§ 371 (c)(1),
(2) Date: Sep. 29, 2021

(87) PCT Pub. No.: WO2020/203962
PCT Pub. Date: Oct. 8, 2020

(65) Prior Publication Data
US 2022/0141480 A1 May 5, 2022

(30) Foreign Application Priority Data

Apr. 1, 2019 (JP) .................................. 2019-069989

(51) Int. Cl.
*H04N 19/46* (2014.01)
*H04N 19/105* (2014.01)
(Continued)

(52) U.S. Cl.
CPC ........... *H04N 19/46* (2014.11); *H04N 19/105* (2014.11); *H04N 19/167* (2014.11); *H04N 19/58* (2014.11)

(58) Field of Classification Search
CPC .... H04N 19/105; H04N 19/167; H04N 19/46; H04N 19/58; H04N 19/146; H04N 19/172; H04N 19/182
(Continued)

(56) References Cited

U.S. PATENT DOCUMENTS

| 2002/0114392 | A1 | 8/2002 | Sekiguchi et al. |
| 2021/0110604 | A1* | 4/2021 | Venshtain ................. G06T 7/74 |
| 2021/0149441 | A1* | 5/2021 | Bartscherer ........... G06F 1/1616 |

FOREIGN PATENT DOCUMENTS

| JP | 2004088801 A | 3/2004 |
| JP | 2010141486 A * | 6/2010 | ............. H04N 5/225 |

(Continued)

OTHER PUBLICATIONS

Seishi Takamura, Atsushi Shimizu, "A Consideration on Efficient Coding for Underwater Video". 32nd Image Coding Symposium, 22nd Video Media Processing Symposium. Nov. 20, 2017, pp. 70-71.

*Primary Examiner* — Behrooz M Senfi
(74) *Attorney, Agent, or Firm* — Harness, Dickey & Pierce, P.L.C.

(57) ABSTRACT

An image generation apparatus for generating a reference image that is referenced when encoding a time-series frame group that is a set of frames in which a second subject is captured so as to be temporally apparently deformed due to a property of a first subject comprises a reference image generation unit that generates the reference image in which a change in an image based on the property of the first subject is suppressed and apparent deformation of the second subject is suppressed.

9 Claims, 10 Drawing Sheets

(51) Int. Cl.
*H04N 19/167* (2014.01)
*H04N 19/58* (2014.01)

(58) Field of Classification Search
USPC .................................................. 375/240.27
See application file for complete search history.

(56) References Cited

FOREIGN PATENT DOCUMENTS

| JP | 201792886 A | | 5/2017 | | |
|---|---|---|---|---|---|
| JP | 2018033080 A | * | 3/2018 | ............. | G06T 5/003 |
| WO | WO-2019193699 A1 | * | 10/2019 | ............. | G06T 19/00 |

* cited by examiner

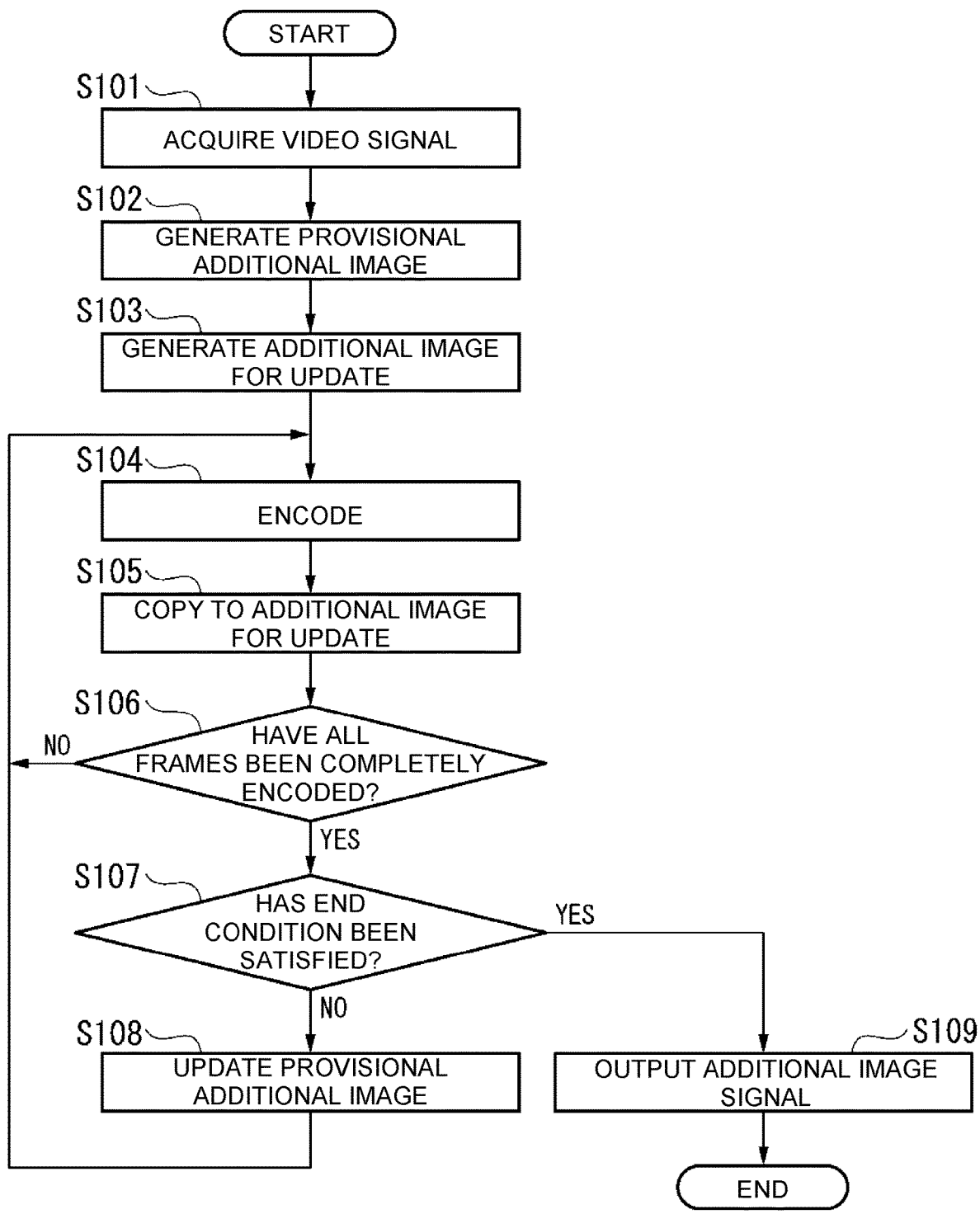

IMAGE GENERATION APPARATUS, IMAGE GENERATION METHOD AND PROGRAM

CROSS-REFERENCE TO RELATED APPLICATIONS

This application is a 371 U.S. National Phase of International Application No. PCT/JP2020/014529 filed on Mar. 30, 2020, which claims priority to Japanese Application No. 2019-069989 filed on Apr. 1, 2019. The entire disclosures of the above applications are incorporated herein by reference.

TECHNICAL FIELD

The present invention relates to an image generation apparatus, an image generation method, and a program.

BACKGROUND ART

Communication schemes defined in international video coding standards, such as H.264/AVC (advanced video coding) and H.265/HEVC (high efficiency video coding) have a mechanism called "long-term reference frame". This is a mechanism in which the image of an area with no change such as the background part in video of a teleconference or the like, or a specific frame of video in which the same pattern appears at a specific cycle such as a rotating object is stored in a frame memory for a long period of time so that they can be continuously referenced at the time of encoding and decoding. There is also a mechanism for generating an image that is encoded or referenced but not displayed (hereinafter referred to as "additional image"), and encoding and decoding input video using the additional image. Conventionally, there has been a technique for improving coding efficiency and realizing more robust coding against transmission line errors by using these mechanisms of the long-term reference frame and the additional image. For example, the video encoding apparatus described in Patent Literature 1 generates an additional image (background image) by calculating an average value, a median value, or the like for the pixel values of the pixels at the same position in a plurality of consecutive encoding target images.

CITATION LIST

Patent Literature

Patent Literature 1: Japanese Patent Laid-Open No. 2017-92886

SUMMARY OF THE INVENTION

Technical Problem

As in the video encoding apparatus described in Patent Literature 1, the conventional encoding that generates an additional image (background image) using the pixel values of the pixels at the same position in a plurality of encoding target images is effective when encoding video having a remarkable difference between a background with no change and a foreground that significantly changes in a short period of time, such as in a teleconference described above. However, in such conventional encoding, the prediction accuracy of motion-compensated prediction may decrease when encoding video containing non-linear movements, irregular movements, or both slow and quick movements, such as video of the water bottom seen through the fluctuating water surface. As a result, there has been a problem of causing an increase in the code amount and deterioration in the image quality of the decoded image.

The present invention has been made in view of the above technical background, and an object thereof is to provide a technique capable of generating an additional image that can suppress an increase in the code amount and deterioration in the image quality even when encoding video containing non-linear movements, irregular movements, or both slow and quick movements.

Means for Solving the Problem

An aspect of the present invention is an image generation apparatus for generating a reference image that is referenced when encoding a time-series frame group that is a set of frames in which a second subject is captured so as to be temporally apparently deformed due to a property of a first subject, the image generation apparatus comprising a reference image generation unit that generates the reference image in which a change in an image based on the property of the first subject is suppressed and apparent deformation of the second subject is suppressed.

Further, an aspect of the present invention is the above-mentioned image generation apparatus, and the reference image generation unit generates the reference image so that a partial area of a first frame constituting the time-series frame group is set as a first area of the reference image, and a partial area of a second frame constituting the time-series frame group is set as a second area of the reference image.

Further, an aspect of the present invention is the above-mentioned image generation apparatus, and the reference image generation unit, when the partial area of the second frame is set as the second area and then a partial area of a third frame constituting the time-series frame group is set as the second area, sets an image that is a median of the partial area of the second frame and the partial area of the third frame as the second area.

Further, an aspect of the present invention is the above-mentioned image generation apparatus, and further comprises a provisional reference image acquisition unit that acquires a provisional reference image that is a reference image that is provisional and that is obtained by using the time-series frame group, and the reference image generation unit generates the reference image by setting a position of the first area to a same position as a reference position in the provisional reference image in prediction targeted for the partial area of the first frame, and setting a position of the second area to a same position as a reference position in the provisional reference image in prediction targeted for the partial area of the second frame.

Further, an aspect of the present invention is the above-mentioned image generation apparatus, and the reference image generated by the reference image generation unit is an image that is encoded by a video encoding apparatus that encodes the time-series frame group, and that is not displayed in video decoded by a video decoding apparatus corresponding to the video encoding apparatus.

Further, an aspect of the present invention is the above-mentioned image generation apparatus, and the reference image generation unit, when a position predicted in a frame constituting the time-series frame group is an integer position, adds a first weight to a pixel in a corresponding area of the reference image, and when a position predicted in a frame constituting the time-series frame group includes a non-integer position, generates a pixel value of a pixel at the non-integer position based on a pixel value of an original image, sets the generated pixel value as pixel values of a plurality of pixels in a corresponding area of the reference image, further adds a second weight to each of the plurality of pixels in the corresponding area of the reference image, and makes a sum of the second weights given to the plurality of pixels equal to the first weight.

Further, an aspect of the present invention is the above-mentioned image generation apparatus, and is an image generation apparatus for generating a reference image that is referenced when encoding a time-series frame group that is a set of frames in which a subject is captured so as to be temporally apparently deformed due to a property of an invisible object, the image generation apparatus comprises a reference image generation unit that generates the reference image in which a change in an image based on the property of the invisible object is suppressed and apparent deformation of the subject is suppressed.

Further, as aspect of the present invention is an image generation method for generating a reference image that is referenced when encoding a time-series frame group that is a set of frames in which a second subject is captured so as to be temporally apparently deformed due to a property of a first subject, the image generation method comprising a reference image generation step of generating the reference image in which a change in an image based on the property of the first subject is suppressed and apparent deformation of the second subject is suppressed.

Further, an aspect of the present invention is a program for causing a computer to function as the above-mentioned image generation apparatus.

Effects of the Invention

The present invention can generate an additional image that can suppress an increase in the code amount and deterioration in the image quality even when encoding video containing non-linear movements, irregular movements, or both slow and quick movements.

BRIEF DESCRIPTION OF DRAWINGS

FIG. 10 is a flowchart showing operation of the image generation apparatus 302 according to an embodiment of the present invention.

DESCRIPTION OF EMBODIMENTS

Hereinafter, a video encoding apparatus according to an embodiment of the present invention will be described with reference to the drawings. First, the configuration of a general video encoding apparatus such as H.265/HEVC and H.264/AVC will be described.

Figure 1:
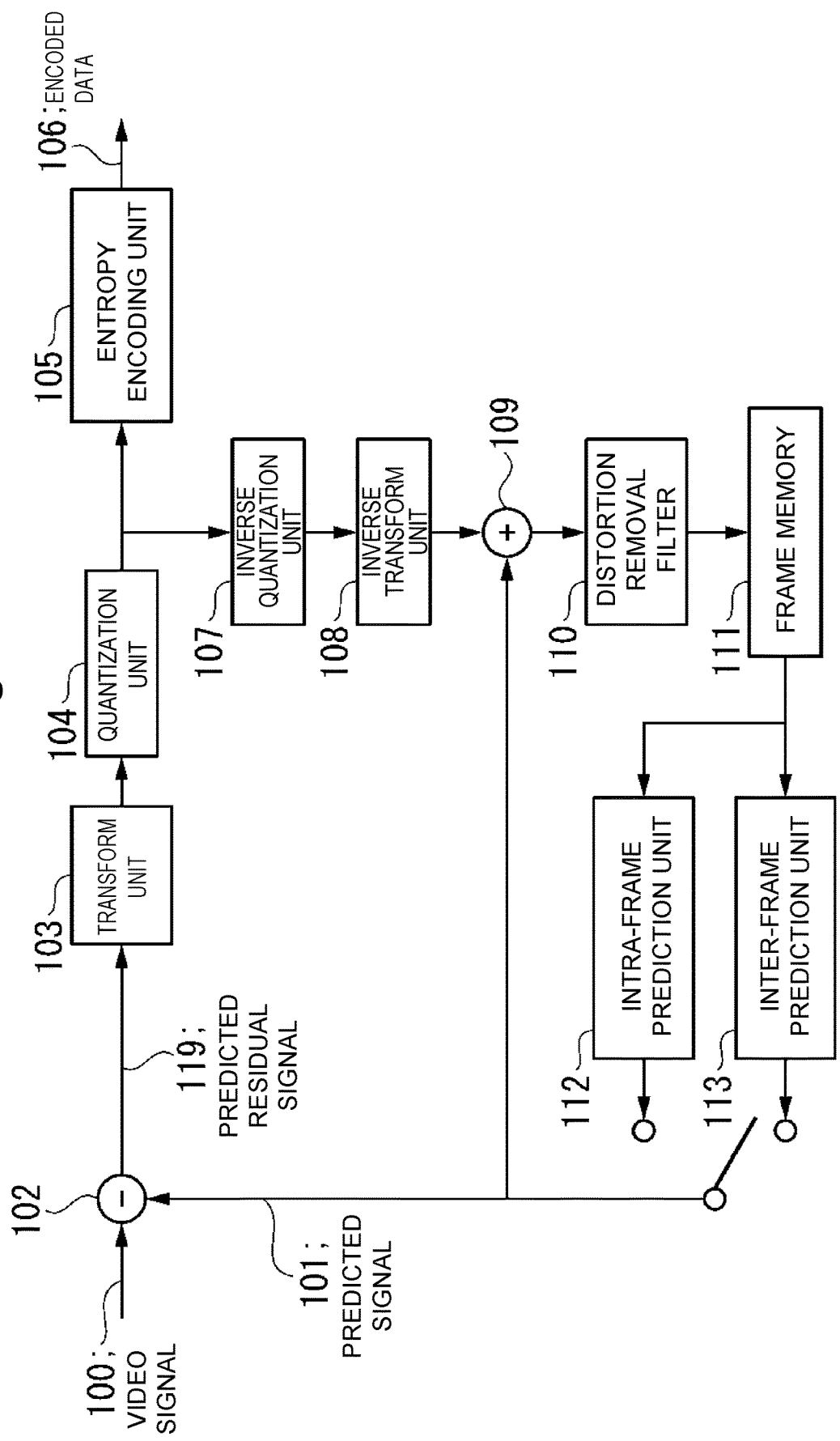
FIG. 1 is a block diagram showing the functional configuration of a general video encoding apparatus.

FIG. 1 is a block diagram showing the functional configuration of a general video encoding apparatus. As shown in FIG. 1, a general video encoding apparatus (hereinafter simply referred to as "video encoding apparatus") receives an encoding target video signal 100 (original signal) as input, and divides the video signal 100 into blocks of, for example, n×n pixels. Then, the video encoding apparatus performs encoding in block units through processes such as prediction and orthogonal transform. The video encoding apparatus outputs encoded data 106 (a bitstream which is a binary signal sequence composed of "0" and "1") generated by the encoding.

As shown in FIG. 1, the video encoding apparatus is configured with a subtraction unit 102, a transform unit 103, a quantization unit 104, an entropy encoding unit 105, an inverse quantization unit 107, an inverse transform unit 108, an addition unit 109, a distortion removal filter 110, a frame memory 111, an intra-frame prediction unit 112, and an inter-frame prediction unit 113.

Figure 2:
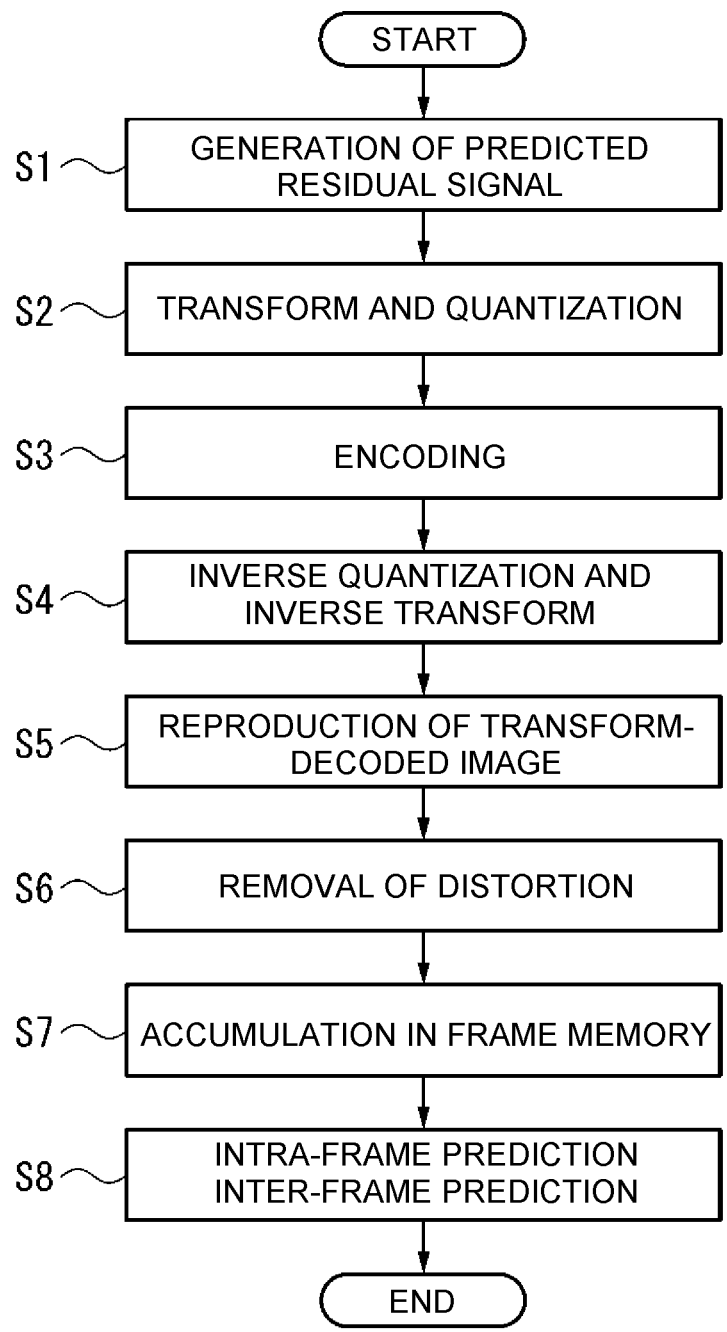
FIG. 2 is a flowchart showing the operation of the general video encoding apparatus.

Next, the processing operation of the video encoding apparatus shown in FIG. 1 will be described with reference to FIG. 2. FIG. 2 is a flowchart showing the processing operation of the general video encoding apparatus.

First, the video encoding apparatus receives input of the video signal 100 from, for example, an external apparatus (not shown), and divides the input video signal 100 into blocks of, for example, n×n pixels. Then, the video encoding apparatus inputs the video signal 100, which is divided into block units, to the subtraction unit 102.

The subtraction unit 102 acquires the video signal 100 in block units. Further, the subtraction unit 102 acquires a predicted signal 101, which is separately generated for each processing unit called a prediction unit (PU), from the intra-frame prediction unit 112 or the inter-frame prediction unit 113. Then, the subtraction unit 102 subtracts the predicted signal 101 from the video signal 100 to generate a predicted residual signal 119 (a difference signal from the original signal) (step S1). The subtraction unit 102 outputs the generated predicted residual signal 119 to the transform unit 103.

The transform unit 103 acquires the predicted residual signal 119 output from the subtraction unit 102. The transform unit 103 performs the discrete cosine transform (DCT), which performs sampling and transform into a discrete signal, on the acquired predicted residual signal 119 (step S2). The transform unit 103 outputs the predicted residual signal 119 subjected to the discrete cosine transform to the quantization unit 104.

The quantization unit 104 acquires the predicted residual signal 119 output from the transform unit 103. The quantization unit 104 quantizes the acquired predicted residual signal 119 (step S2). The quantization unit 104 outputs the quantized predicted residual signal 119 to the entropy encoding unit 105 and the inverse quantization unit 107.

The entropy encoding unit 105 acquires the predicted residual signal 119 output from the quantization unit 104. The entropy encoding unit 105 performs entropy encoding on the acquired predicted residual signal 119 to generate the encoded data 106 (step S3). The entropy encoding unit 105 outputs the generated encoded data 106 to, for example, an external apparatus (not shown) such as a video decoding apparatus corresponding to this video encoding apparatus.

On the other hand, the inverse quantization unit 107 also acquires the predicted residual signal 119 output from the quantization unit 104. The inverse quantization unit 107 inverse-quantizes the acquired predicted residual signal 119 (step S4). The inverse quantization unit 107 outputs the inverse-quantized predicted residual signal 119 to the inverse transform unit 108.

The inverse transform unit 108 acquires the predicted residual signal 119 output from the inverse quantization unit 107. The inverse transform unit 108 performs the inverse discrete cosine transform (inverse DCT) on the acquired predicted residual signal 119 (step S4). The inverse transform unit 108 outputs the predicted residual signal 119 subjected to the inverse discrete cosine transform to the addition unit 109.

The addition unit 109 acquires the predicted residual signal 119 output from the inverse transform unit 108. Further, the addition unit 109 acquires the predicted signal 101, which is separately generated for each prediction unit (PU), from the intra-frame prediction unit 112 or the inter-frame prediction unit 113. The addition unit 109 adds the predicted residual signal 119 and the predicted signal 101 to generate a signal indicating decoded video (step S5). The addition unit 109 outputs the generated signal to the distortion removal filter 110.

The distortion removal filter 110 acquires the signal indicating the decoded video output from the addition unit 109. The distortion removal filter 110 removes distortion from the acquired signal (step S6), and the distortion removal filter 110 stores the distortion-removed signal in the frame memory 111 (step S7).

The signal accumulated in the frame memory 111 will be the same signal as a decoded video signal that is calculated by the video decoding apparatus corresponding to this video encoding apparatus. Note that the signal accumulated in the frame memory 111 is generally automatically deleted when a predetermined period of time has elapsed. However, a signal given an indication that it is referenced for a long period of time (i.e., a long-term reference frame) is not automatically deleted, but is deleted when an explicit instruction of deletion is given. Further, a signal given an indication that it is not referenced is not stored in the frame memory 111.

The intra-frame prediction unit 112 or the inter-frame prediction unit 113 performs intra-frame prediction (intra-prediction) or inter-frame prediction (inter-prediction) with reference to the signal accumulated in the frame memory 111 to generate a predicted signal 101 to be used for encoding of the next block (step S8). The intra-frame prediction unit 112 or the inter-frame prediction unit 113 outputs the generated predicted signal 101 to the subtraction unit 102 and the addition unit 109.

After the processes of steps S1-S8 described above are iterated for all the blocks of the image input to the video encoding apparatus, the operation of the video encoding apparatus shown in the flowchart of FIG. 2 ends.

Figure 3:
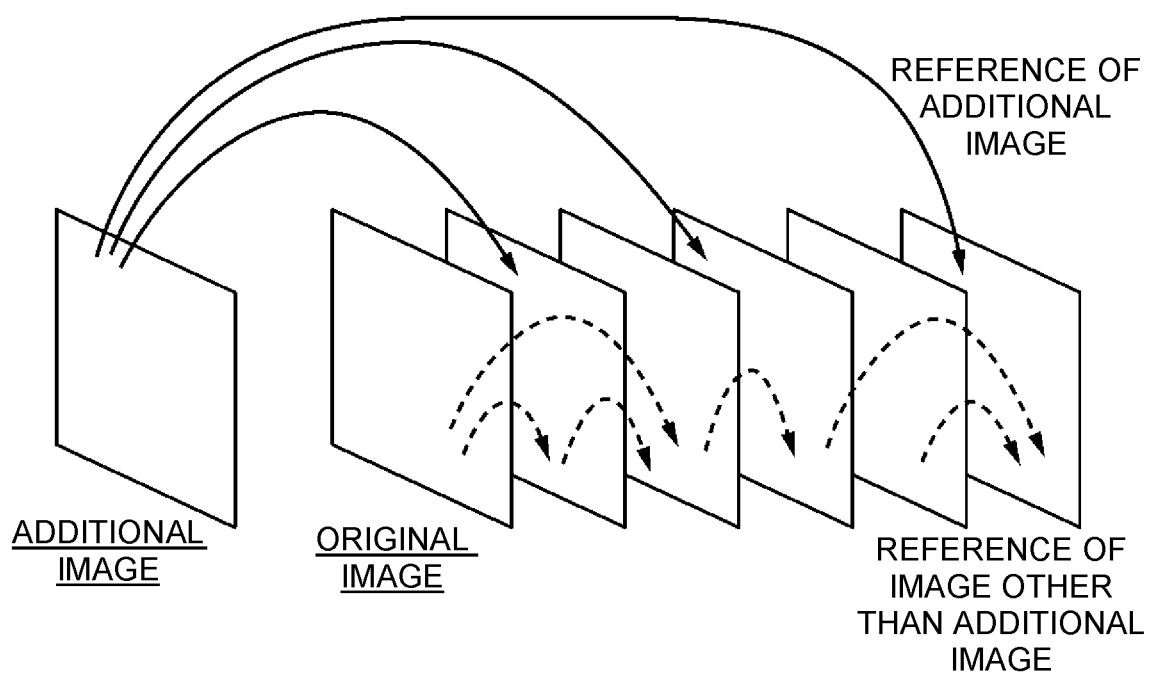
FIG. 3 is an explanatory diagram showing the use of an additional image in general video encoding.

FIG. 3 is a schematic diagram for explaining the use of an additional image in a general video encoding apparatus. As shown in FIG. 3, the video encoding apparatus makes predictions by referencing the additional image, referencing frames before and after the encoding target frame, or referencing other pixels within the same frame to encode each frame of original images (input images).

The additional image is generated in advance using the original images before encoding. For example, the average value or median value of pixel values is calculated for the pixels at the same position in the respective frames of the original images. Then, an additional image having the calculated average value or median value as the pixel value is generated.

[Configuration of Video Encoding System]

Figure 4:
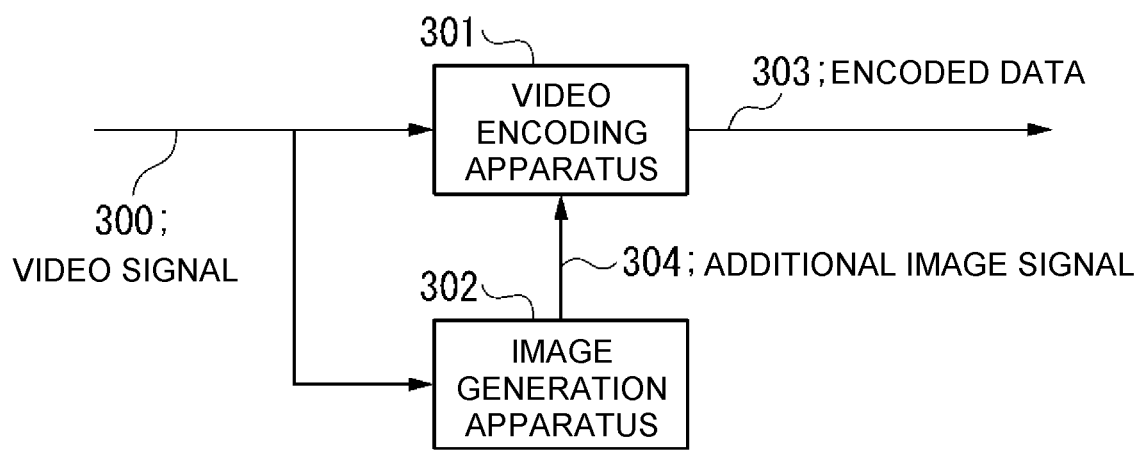
FIG. 4 is an overall configuration diagram of a video encoding system according to an embodiment of the present invention.

Hereinafter, the overall configuration of a video encoding system according to an embodiment of the present invention will be described. FIG. 4 is an overall configuration diagram of a video encoding system according to an embodiment of the present invention. As shown in FIG. 4, the video encoding system is configured with a video encoding apparatus 301 and an image generation apparatus 302.

The video encoding apparatus 301 is the general video encoding apparatus whose functional configuration and operation have been described with reference to FIGS. 1 and 2. The video encoding apparatus 301 outputs generated encoded data 303 to, for example, an external apparatus (not shown) such as a video decoding apparatus corresponding to the video encoding apparatus 301. Note that the video encoding apparatus 301 receives input of an additional image signal 304 from the image generation apparatus 302, and encodes a video signal 3001 with reference to an additional image based on the additional image signal 304.

The image generation apparatus 302 receives input of the same video signal as the video signal 300 input to the video encoding apparatus 301. The image generation apparatus 302 generates the additional image based on the input video signal 300. The image generation apparatus 302 outputs the additional image signal 304 indicating the generated additional image to the video encoding apparatus 301.

[Generation of Additional Image]

Hereinafter, generation of an additional image by the image generation apparatus 302 according to an embodiment of the present invention will be described.

Figure 5:
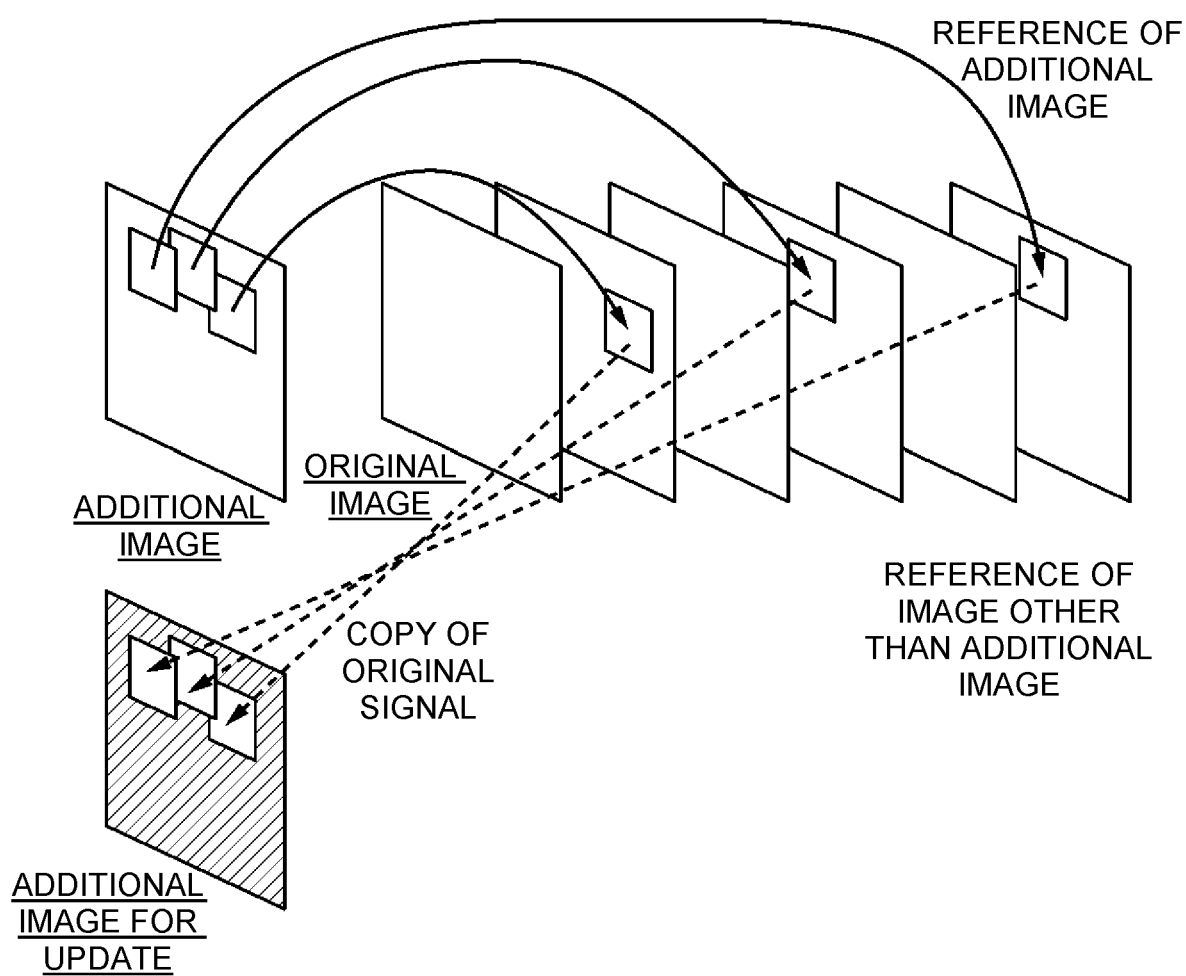
FIG. 5 is an explanatory diagram showing generation of an additional image by an image generation apparatus 302 according to an embodiment of the present invention.

FIG. 5 is an explanatory diagram showing generation of an additional image by the image generation apparatus 302 according to an embodiment of the present invention. First, the image generation apparatus 302 generates an additional image that is provisional (hereinafter referred to as "provisional additional image") using any method. Note that the image generation apparatus 302 may generate the provisional additional image by the above-described conventional method of generating an additional image, that is, the method of calculating the average value or median value of pixel values for the pixels at the same position in the respective frames of the original images.

The image generation apparatus 302 performs motion-compensated prediction encoding on each frame of the original images with reference to the provisional additional image. Here, when having performed motion-compensated prediction encoding with reference to the provisional additional image, the image generation apparatus 302 copies the image (original signal) corresponding to the predicted area in the frame of an original image to an additional image for update that is separately generated (hereinafter referred to as "additional image for update"). At this time, the image generation apparatus 302 copies the image in the original image described above to the position in the additional image for update that is the same position as the position in the provisional additional image referenced in the motion-compensated prediction encoding described above.

As described above, each time the provisional additional image is referenced, the image in the original image is copied to the additional image for update, so that the additional image for update is updated each time. Note that the image generation apparatus 302 can generate the additional image for update at the initial point of time by any method. For example, the image generation apparatus 302 may use the same image as the above generated provisional additional image as the additional image for update at the initial point of time.

When having finished motion-compensated prediction encoding of a predetermined number of frames, the image generation apparatus 302 sets the additional image for update at that point of time as a new provisional additional image. Then, the image generation apparatus 302 performs motion-compensated prediction encoding again on each frame in the same manner as described above with reference to the new provisional additional image.

In this way, the image generation apparatus 302 iteratively performs motion-compensated prediction encoding on a frame group of original images to update the provisional additional image each time. Then, when a predetermined condition has been satisfied, the image generation apparatus 302 ends iterative processing of motion-compensated prediction encoding for the frame group. The image generation apparatus 302 sets the provisional additional image at the point of time when the iterative processing is ended as the final additional image, and outputs the additional image signal 304 based on the final additional image to the video encoding apparatus 301.

Note that the above predetermined condition for ending the iterative processing of motion-compensated prediction encoding is, for example, that the value of the image compression rate converges (i.e., the improvement percentage of the image compression rate is within a specified value as compared with the previous iterative processing). Alternatively, the above predetermined condition may be, for example, that the image compression rate deteriorates as compared with the previous iterative processing, that the image compression rate satisfies a predetermined value, or that the iterative processing has been performed a predetermined number of times.

Note that for a pixel in the additional image for update to which copying is performed from a plurality of frames, the image generation apparatus 302 sets, for example, the average value of the plurality of copied pixel values as the pixel value of the pixel.

Note that when detecting a scene change in the video signal 300, the image generation apparatus 302 may generate a new provisional additional image and an additional image for update at the time of the detection.

Note that the additional image signal 304 indicating the above generated final additional image is output to the video encoding apparatus 301 and used for encoding the video signal 300. Further, the additional image signal 304 is also encoded. Then, the video encoding apparatus 301 outputs the encoded data 303 that is data in which the original images and the additional image are encoded.

A video decoding apparatus (not shown) corresponding to the video encoding apparatus 301 acquires the encoded data 303 output from the video encoding apparatus 301. Then, the video decoding apparatus decodes the encoded data 303 in which the original images and the additional image are encoded. Note that the decoded additional image is an image that is used for reference in the decoding process of the original images by the video decoding apparatus, but is not displayed.

Note that as described above, for example, when the additional image for update at the initial point of time is generated by calculating the average value or median value for each pixel value, the initial additional image for update becomes a low-sharpness (blurred) image because the average value or median value is used. After that, since the original images themselves are copied to the additional image for update as described above, the sharpness of the additional image for update increases every time the above iterative processing is performed.

Note that as described above, the image generation apparatus 302 copies the image of the predicted area in an original image to the position in the additional image for update that is the same position as the position in the provisional additional image referenced in the motion-compensated prediction encoding described above. Therefore, the additional image for update becomes close to an image in which the influence of irregular movements of subjects is eliminated. That is, it becomes close to an image of the water bottom or an object in water in which the influence of irregular movements of a fluctuating water surface or the like is eliminated, and which has no fluctuations.

Note that the position on the original image predicted by motion-compensated prediction may not be a pixel position that can be represented by integer coordinate values (hereinafter referred to as "integer positions"). In this case, the image generation apparatus 302 may copy the original image to the additional image for update as follows.

Figure 6:
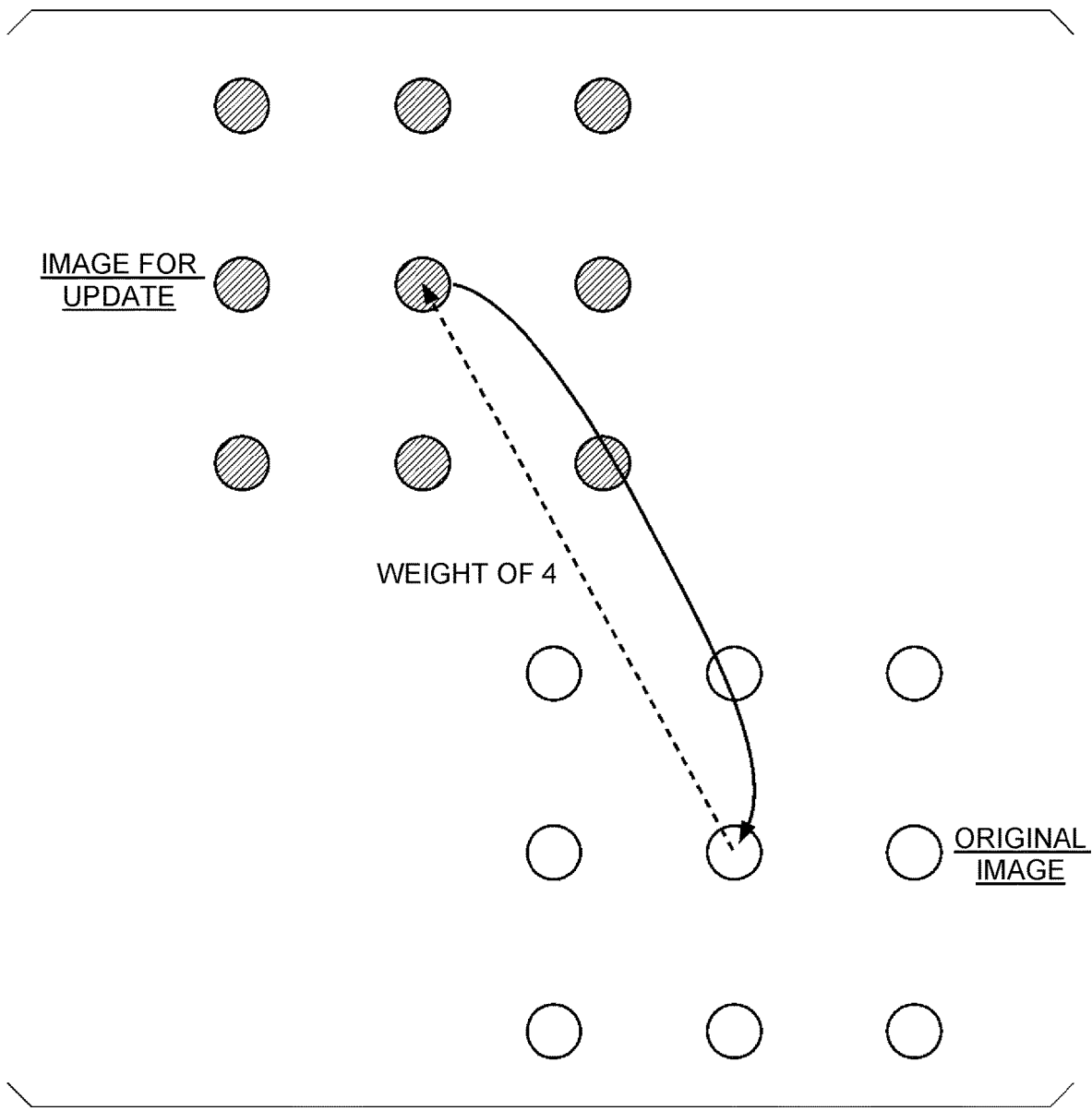
FIG. 6 is an explanatory diagram showing weighting at the time of generation of an additional image by the image generation apparatus 302 according to an embodiment of the present invention.
Figure 7:
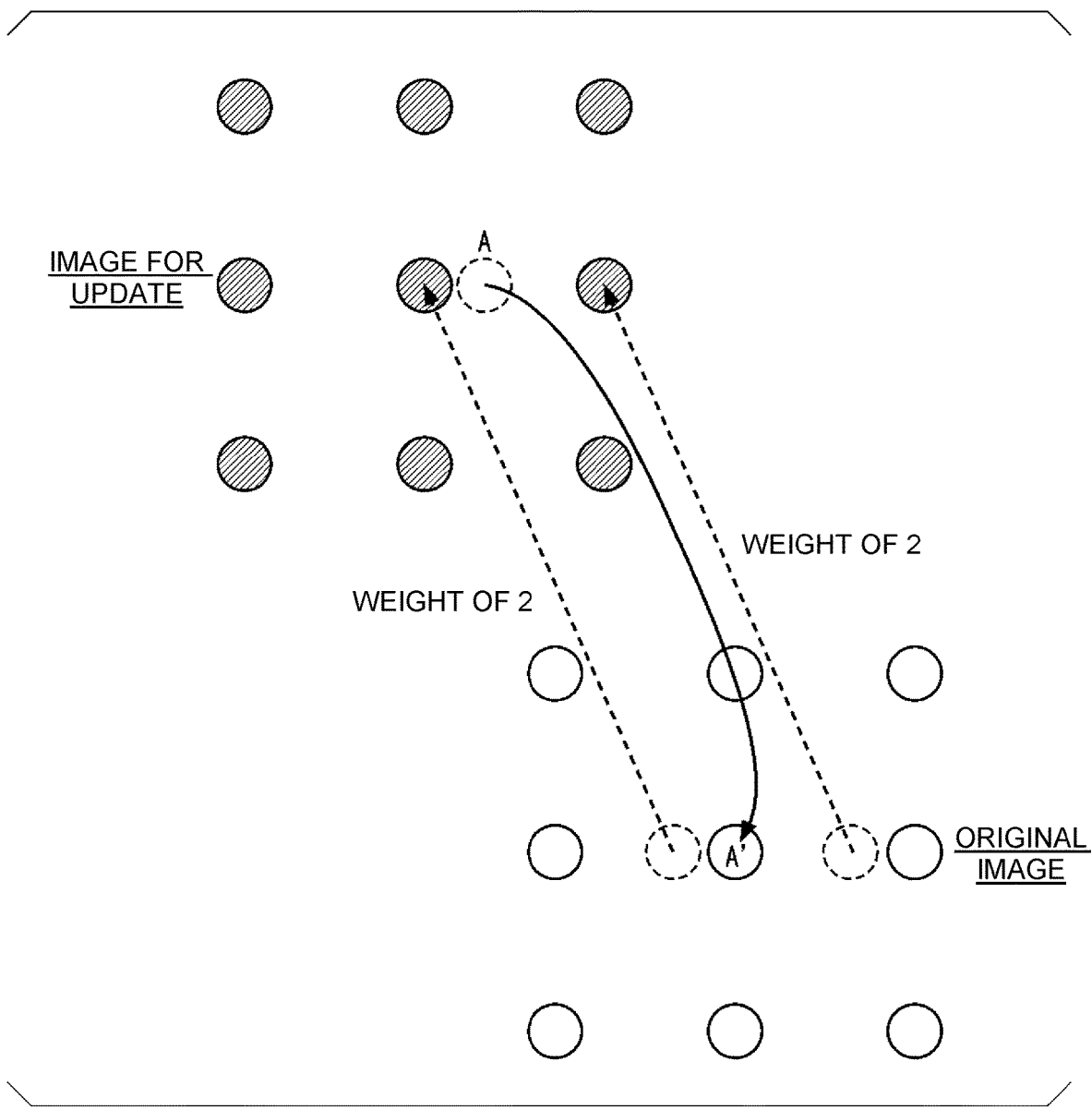
FIG. 7 is an explanatory diagram showing weighting at the time of generation of an additional image by the image generation apparatus 302 according to an embodiment of the present invention.
Figure 8:
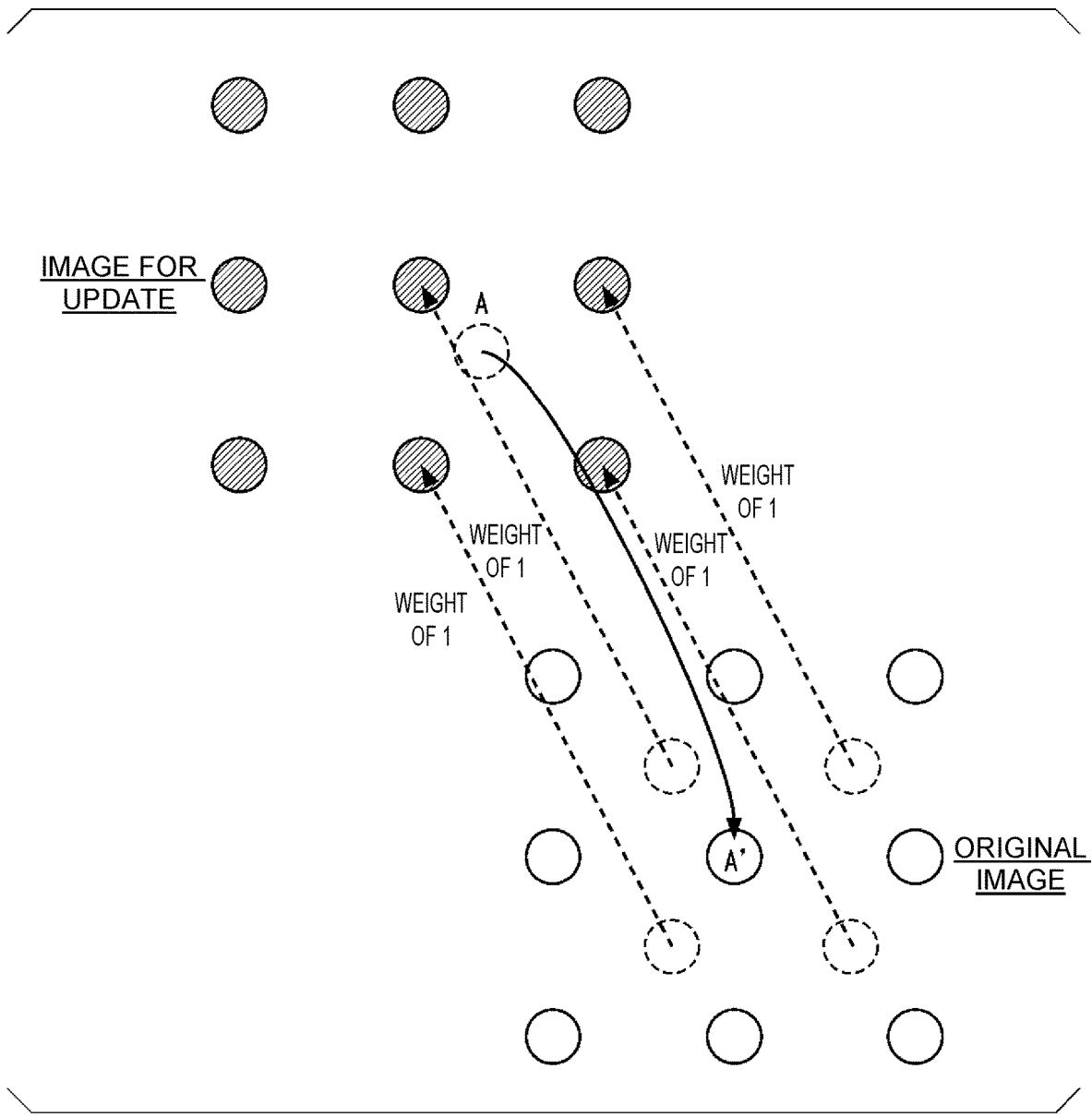
FIG. 8 is an explanatory diagram showing weighting at the time of generation of an additional image by the image generation apparatus 302 according to an embodiment of the present invention.

FIGS. 6-8 are explanatory diagrams showing weighting at the time of generation of an additional image by the image generation apparatus 302 according to an embodiment of the present invention. FIG. 6 shows a case where the pixel position of a copy target pixel in the original image that is the copy source has X and Y coordinates both of which are integer positions. In this case, for example, the image generation apparatus 302 weights the pixel value of the pixel on the original image with a weight of 4, and then copies it to the additional image for update.

Further, FIG. 7 shows a case where the pixel position of a copy target pixel in the original image that is the copy source has an X coordinate which is a position that is not an integer position (hereinafter referred to as "non-integer position") and has a Y coordinate that is an integer position. In this case, the image generation apparatus 302 performs interpolation using the pixel values at the integer positions adjacent to each other in the X-axis direction to calculate the pixel value at the non-integer position existing between the integer positions adjacent to each other in the X-axis direction. Then, the image generation apparatus 302 weights each of the calculated pixel values of the interpolated image with a weight of 2, and then copies it to the integer position in the additional image for update.

Further, FIG. 8 shows a case where the pixel position of a copy target pixel in the original image that is the copy source has X and Y coordinates both of which are non-integer positions. In this case, the image generation apparatus 302 performs interpolation using the pixel values at the integer positions adjacent to each other in the X-axis direction and the Y-axis direction to calculate the pixel value at the non-integer position surrounded by the integer positions. Then, the image generation apparatus 302 weights each of the calculated pixel values of the interpolated image with a weight of 1, and then copies it to the integer position in the additional image for update.

In this way, even if the pixel position of the copy target pixel in the original image that is the copy source is an integer position, or even if the pixel position of the copy target pixel in the original image that is the copy source is a non-integer position, the image generation apparatus 302 copies the image to the additional image for update in such a manner that the sum of the weights given to the pixel values to be copied is equal.

Note that when bidirectional motion-compensated prediction is performed on a given image area from the provisional additional image and an image other than the provisional additional image, it is preferable not to copy the original image to the additional image for update. This is because the image area is not suitable for generating an effective additional image.

Note that regarding the interpolation method, a general method used in H.265/HEVC or the like can be used.

[Functional Configuration of Image Generation Apparatus]

Hereinafter, a functional configuration of the image generation apparatus 302 according to an embodiment of the present invention will be described. The image generation apparatus 302 is an apparatus for generating an additional image (reference image) that is referenced when encoding a time-series frame group (original signal) that is a set of frames in which a second subject (e.g., the water bottom or an object in water) is captured so as to be temporally apparently deformed due to a property of a first subject (e.g., a water surface).

Figure 9:
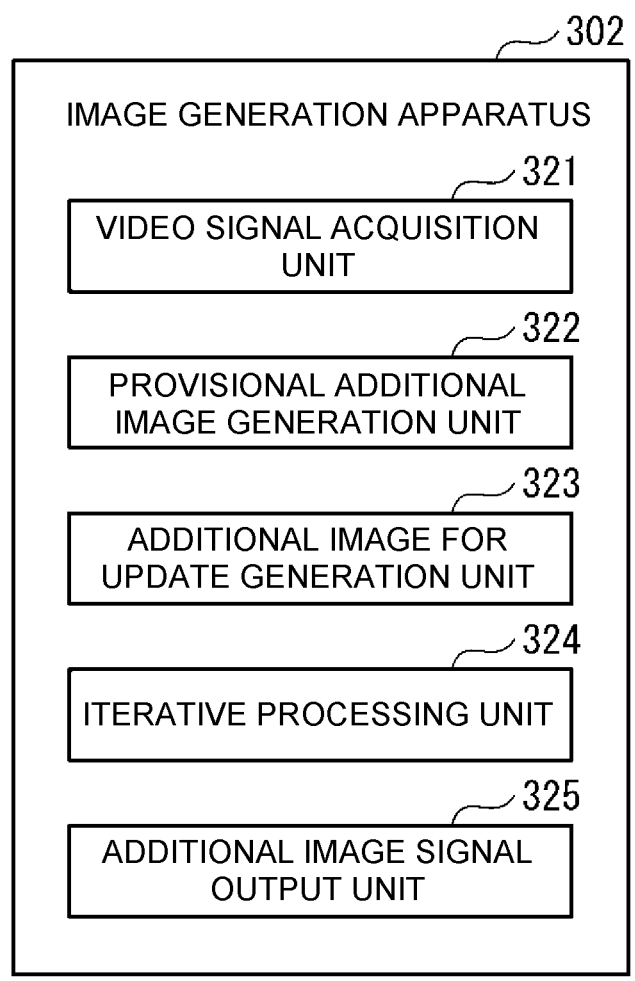
FIG. 9 is a block diagram showing a functional configuration of the image generation apparatus 302 according to an embodiment of the present invention.

FIG. 9 is a block diagram showing a functional configuration of the image generation apparatus 302 according to an embodiment of the present invention. As shown in FIG. 9, the image generation apparatus 302 is configured with a video signal acquisition unit 321, a provisional additional image generation unit 322, an additional image for update generation unit 323, an iterative processing unit 324, and an additional image signal output unit 325.

The video signal acquisition unit 321 acquires the same video signal as the video signal 300 input to the video encoding apparatus 301. The video signal acquisition unit 321 outputs the acquired video signal 300 to the provisional additional image generation unit 322 and the iterative processing unit 324.

The provisional additional image generation unit 322 acquires the video signal 300 output from the video signal acquisition unit 321. The video signal acquisition unit 321 generates a provisional additional image based on the acquired video signal 300. The provisional additional image generation unit 322 outputs the generated provisional additional image to the iterative processing unit 324. In this way, the provisional additional image generation unit 322 (provisional reference image acquisition unit) obtains a provisional additional image (provisional reference image) that is a reference image that is provisional and that is obtained using a time-series frame group of original images based on the video signal 300.

The additional image for update generation unit 323 generates an additional image for update. The additional image for update generation unit 323 uses, for example, the same image as the provisional additional image generated by the provisional additional image generation unit 322 as the additional image for update. The additional image for update generation unit 323 outputs the generated additional image for update to the iterative processing unit 324.

The iterative processing unit 324 acquires the video signal 300 output from the video signal acquisition unit 321. The iterative processing unit 324 also acquires the provisional additional image output from the provisional additional image generation unit 322. The iterative processing unit 324 also acquires the additional image for update output from the additional image for update generation unit 323.

The iterative processing unit 324 performs motion-compensated prediction encoding on each frame of the original images based on the video signal 300 with reference to the provisional additional image. When performing motion-compensated prediction encoding with reference to the provisional additional image, the iterative processing unit 324 copies the image (original signal) of the area predicted in the frame of the original image to the additional image for update. At this time, the iterative processing unit 324 copies the image in the original image described above to the position in the additional image for update that is the same position as the position in the provisional additional image referenced in the motion-compensated prediction encoding described above.

When the above-mentioned encoding and copying to the additional image for update have been completed for all of a predetermined number of frames based on the video signal 300, the iterative processing unit 324 determines whether an end condition of the iterative processing has been satisfied. For example, the iterative processing unit 324 makes a determination under the end condition that the value of the image compression rate has converged (i.e., the improvement percentage of the image compression rate has become within a predetermined value as compared with the previous iterative processing).

When it is determined that the end condition has not been satisfied, the iterative processing unit 324 sets the additional image for update at that point of time as a new provisional additional image. Then, the iterative processing unit 324 performs motion-compensated prediction encoding again on each frame in the same manner as described above with reference to the new provisional additional image.

On the other hand, when it is determined in step S107 that the end condition has been satisfied, the iterative processing unit 324 outputs the provisional additional image at that point of time to the additional image signal output unit 325 as the final additional image.

With the above configuration, the iterative processing unit 324 (reference image generation unit) generates an additional image (reference image) in which a change in an image based on a property of the first subject (e.g., a water surface) is suppressed and apparent deformation of the second subject (e.g., the water bottom or an object in water) is suppressed. Further, the iterative processing unit 324 generates the additional image for update (reference image) so that a partial area of a first frame constituting the time-series frame group based on the video signal 300 is set as a first area of the additional image for update (reference image), and a partial area of a second frame constituting the time-series frame group is set as a second area of the additional image for update (reference image).

Further, when the partial area of the second frame is set as the second area, and then a partial area of a third frame constituting the time-series frame group is set as the second area, the iterative processing unit 324 (reference image generation unit) sets an image that is the median of the partial area of the second frame and the partial area of the third frame as the second area.

In addition, the iterative processing unit 324 (reference image generation unit) generates the additional image for update (reference image) by setting the position of the first area to the same position as a reference position in the provisional additional image (provisional reference image) in prediction targeted for the partial area of the first frame, and setting the position of the second area to the same position as the reference position in the provisional additional image (provisional reference image) in prediction targeted for the partial area of the second frame.

Note that the final additional image (reference image) generated by the iterative processing unit 324 (reference image generation unit) is an image that is encoded by the video encoding apparatus 301 that encodes the time-series frame group, and that is not displayed in video decoded by a video decoding apparatus (not shown) corresponding to the video encoding apparatus 301.

When a position predicted in a frame constituting the time-series frame group is an integer position, the iterative processing unit 324 (reference image generation unit) adds a first weight to a pixel in a corresponding area of the additional image for update (reference image). Further, when a position predicted in a frame constituting the time-series frame group includes a non-integer position, the iterative processing unit 324 generates the pixel value of the pixel at the non-integer position based on the pixel value of the original image, and sets the generated pixel value as the pixel values of a plurality of pixels in a corresponding area of the additional image for update (reference image). Then, the iterative processing unit 324 further adds a second weight to each of the plurality of pixels in the corresponding area of the additional image for update (reference image). Here, the iterative processing unit 324 makes the sum of the second weights given to the plurality of pixels equal to the first weight.

The additional image signal output unit 325 acquires the additional image output from the iterative processing unit 324. The additional image signal output unit 325 outputs the additional image signal 304 indicating the additional image to the video encoding apparatus 301.

[Operation of Image Generation Apparatus]

Hereinafter, operation of the image generation apparatus 302 according to an embodiment of the present invention will be described. FIG. 10 is a flowchart showing operation of the image generation apparatus 302 according to an embodiment of the present invention. This flowchart starts when the same video signal as the video signal 300 input to the video encoding apparatus 301 is input to the image generation apparatus 302.

The video signal acquisition unit 321 acquires the video signal 300 (step S101). The provisional additional image generation unit 322 generates a provisional additional image based on the acquired video signal 300 (step S102). The additional image for update generation unit 323 generates an additional image for update (e.g., by using the same image as the provisional additional image generated in step S102 as the additional image for update) (step S103).

The iterative processing unit 324 performs motion-compensated prediction encoding on each frame of the original images based on the video signal 300 with reference to the generated provisional additional image (step S104). When motion-compensated prediction encoding is performed with reference to the provisional additional image, the iterative processing unit 324 copies the image (original signal) of the area targeted for prediction in the frame of the original image to the additional image for update (step S105). At this time, the iterative processing unit 324 copies the image in the original image described above to the position in the additional image for update that is the same position as the position in the provisional additional image referenced in the motion-compensated prediction encoding described above.

When the encoding in step S104 described above and the copying to the additional image for update in step S105 described above have been completed for all the predetermined number of frames based on the video signal 300 (Yes in step S106), the iterative processing unit 324 determines whether the end condition of the iterative processing has been satisfied (step S107). For example, the iterative processing unit 324 makes a determination under the end condition that the value of the image compression rate has converged (i.e., the improvement percentage of the image compression rate has become within a predetermined value as compared with the previous iterative processing).

When it is determined that the end condition has not been satisfied (No in step S107), the iterative processing unit 324 updates the provisional additional image so that the additional image for update at that point of time is set as a new provisional additional image (step S108). Then, the iterative processing unit 324 performs motion-compensated prediction encoding again on each frame in the same manner as described above with reference to the new provisional additional image (step S104).

On the other hand, when the iterative processing unit 324 has determined that the end condition has been satisfied in step S107 (No in step S107), the additional image signal output unit 325 sets the provisional additional image at that point of time as the final additional image, and outputs the additional image signal 304 indicating the additional image to the video encoding apparatus 301 (step S109). Thus, the operation of the image generation apparatus 302 shown in the flowchart of FIG. 10 ends.

As described above, the image generation apparatus 302 according to an embodiment of the present invention is an apparatus for generating a reference image (additional image) that is referenced when encoding a time-series frame group that is a set of frames in which a second subject (e.g., the water bottom or an object in water) is captured so as to be temporally apparently deformed due to a property of a first subject (e.g., a water surface). Then, the image generation apparatus 302 comprises the iterative processing unit 324 (reference image generation apparatus) that generates the reference image in which a change in an image based on a property of the first subject is suppressed and apparent deformation of the second subject is suppressed.

By providing the above configuration, the image generation apparatus 302 can suppress an increase in the code amount and deterioration in the image quality even when video containing non-linear movements, irregular movements, or both slow and quick movements is targeted for encoding.

Note that the above embodiments have been described, as an example, for a case where the encoding target video is video in which the water bottom or an object in water seen through the fluctuating water surface is captured, but there is no limitation thereto. For example, the present invention is effective in general for encoding of video containing non-linear movements, irregular movements, or both slow and quick movements of, for example, an object reflected on a curved surface, an object that appears to fluctuate under the influence of an invisible object or atmospheric fluctuations, a flag fluttering in the wind, and a cell or an object that pulses, pulsates, or beats.

Some or all of the image generation apparatus 302 in the embodiments described above may be implemented using a computer. In this case, it may be implemented by recording a program for implementing this function in a computer-readable recording medium, and causing a computer system to read and execute the program recorded in this recording medium. Note that the term "computer system" as used herein is intended to include an OS and hardware such as peripheral equipment. In addition, "computer-readable recording medium" refers to a portable medium such as a flexible disk, a magneto-optical disk, ROM, and CD-ROM, and a storage apparatus such as a hard disk incorporated in a computer system. Further, "computer-readable recording medium" may also include something that dynamically holds a program for a short period of time like a communication wire in transmitting a program via a network such as the Internet or a communication line such as a telephone line, or something that holds a program for a certain period of time such as a volatile memory inside a computer system serving as a server or a client in that case. In addition, the above program may be for implementing a part of the functions described above, may further be something that can implement the functions described above in combination with a program already recorded in the computer system, or may be something that is implemented using hardware such as a PLD (programmable logic device) or an FPGA (field programmable gate array).

Although the embodiments of the present invention have been described above with reference to the drawings, it is clear that the above embodiments are merely illustrations of the present invention, and the present invention is not limited to the above embodiments. Therefore, additions, omissions, replacements, and other changes of components may be made without departing from the technical thought and spirit of the present invention.

REFERENCE SIGNS LIST

102 Subtraction unit
103 Transform unit
104 Quantization unit
105 Entropy encoding unit
107 Inverse quantization unit
108 Inverse transform unit
109 Addition unit
110 Distortion removal filter
111 Frame memory
112 Intra-frame prediction unit
113 Inter-frame prediction unit
301 Video encoding apparatus
302 Image generation apparatus
321 Video signal acquisition unit
322 Provisional additional image generation unit
323 Additional image for update generation unit
324 Iterative processing unit
325 Additional image signal output unit

The invention claimed is:

1. An image generation apparatus for generating a reference image that is referenced when encoding a time-series frame group that is a set of frames in which a second subject is captured so as to be temporally apparently deformed due to a property of a first subject, the image generation apparatus comprising:
a processor; and
a storage medium having computer instructions stored thereon, when executed by the processor, perform to:
generates the reference image in which a change in an image based on the property of the first subject is suppressed and apparent deformation of the second subject is suppressed.

2. The image generation apparatus according to claim 1, wherein the computer program instructions further perform to
generates the reference image so that a partial area of a first frame constituting the time-series frame group is set as a first area of the reference image, and a partial area of a second frame constituting the time-series frame group is set as a second area of the reference image.

3. The image generation apparatus according to claim 2, wherein the computer program instructions further perform to when the partial area of the second frame is set as the second area and then a partial area of a third frame constituting the time-series frame group is set as the second area, sets an image that is a median of the partial area of the second frame and the partial area of the third frame as the second area.

4. The image generation apparatus according to claim 2, wherein the computer program instructions further perform to
acquires a provisional reference image that is a reference image that is provisional and that is obtained by using the time-series frame group, and
generates the reference image by setting a position of the first area to a same position as a reference position in the provisional reference image in prediction targeted for the partial area of the first frame, and setting a position of the second area to a same position as a reference position in the provisional reference image in prediction targeted for the partial area of the second frame.

5. The image generation apparatus according to claim 1, wherein the reference image is an image that is encoded by a video encoding apparatus that encodes the time-series frame group, and that is not displayed in video decoded by a video decoding apparatus corresponding to the video encoding apparatus.

6. The image generation apparatus according to claim 1, wherein
the reference image generation unit
when a position predicted in a frame constituting the time-series frame group is an integer position, adds a first weight to a pixel in a corresponding area of the reference image, and when a position predicted in a frame constituting the time-series frame group includes a non-integer position, generates a pixel value of a pixel at the non-integer position based on a pixel value of an original image, sets the generated pixel value as pixel values of a plurality of pixels in a corresponding area of the reference image, further adds a second weight to each of the plurality of pixels in the corresponding area of the reference image, and makes a sum of the second weights given to the plurality of pixels equal to the first weight.

7. An image generation apparatus for generating a reference image that is referenced when encoding a time-series frame group that is a set of frames in which a subject is captured so as to be temporally apparently deformed due to a property of an invisible object, the image generation apparatus comprising:
a processor; and
a storage medium having computer instructions stored thereon, when executed by the processor, perform to:
generates the reference image in which a change in an image based on the property of the invisible object is suppressed and apparent deformation of the subject is suppressed.

8. An image generation method for generating a reference image that is referenced when encoding a time-series frame group that is a set of frames in which a second subject is captured so as to be temporally apparently deformed due to a property of a first subject, the image generation method comprising:
- a reference image generation step of generating the reference image in which a change in an image based on the property of the first subject is suppressed and apparent deformation of the second subject is suppressed.

9. A non-transitory computer-readable medium having computer-executable instructions that, upon execution of the instructions by a processor of a computer, cause the computer to function as the image generation apparatus according to claim 1.

* * * * *